Figure 1:
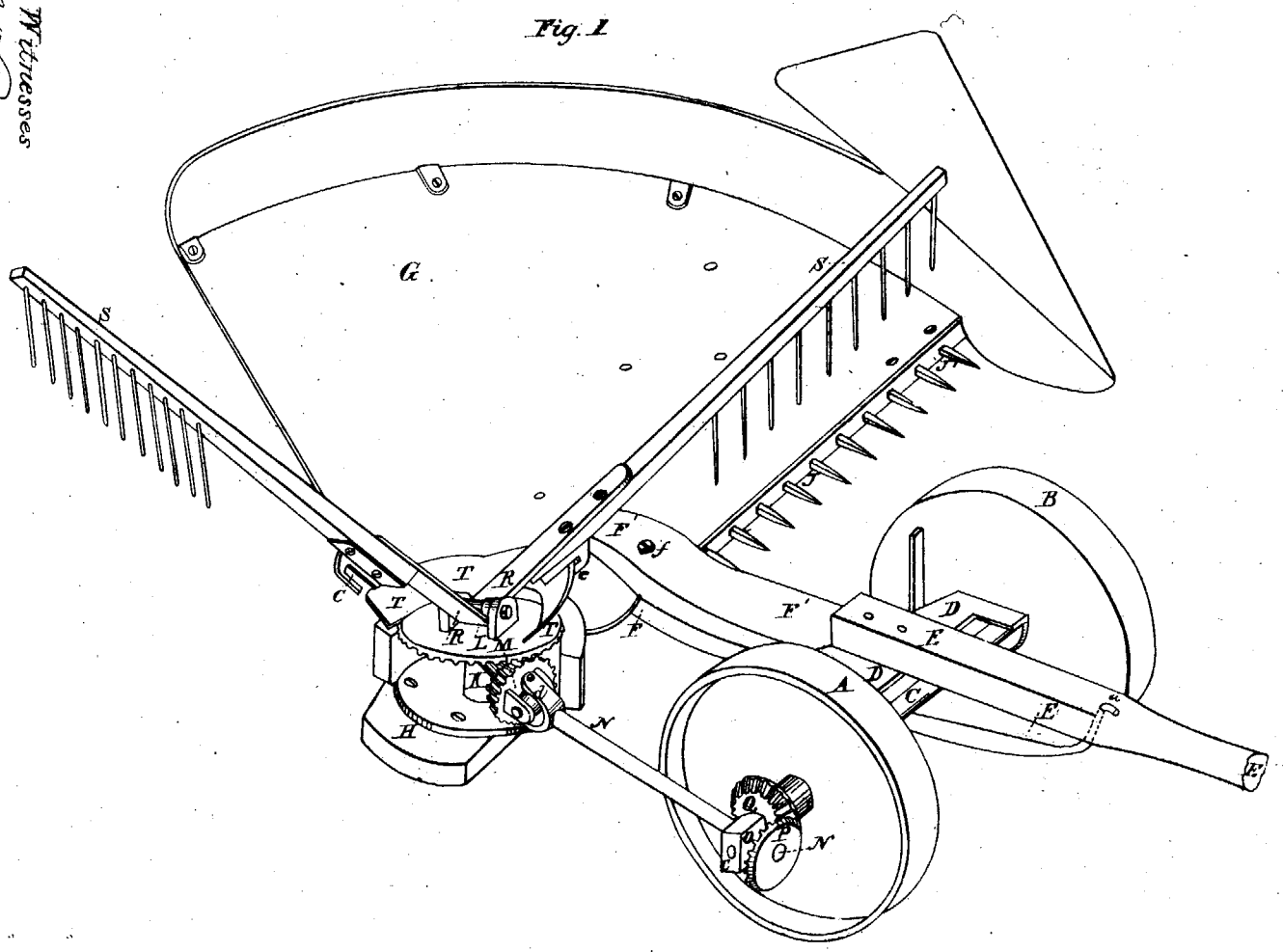

Sheet 1-2 Sheets

McC. Young, Jr.

Harvester Rake.

No. 2454 Reissued Jan. 15, 1867.

Witnesses

G. E. Buckley

J. McGlasin Jr.

Inventor

Andrew J. Holman

McC. Young, Jr.
Harvester Rake.
No. 2454
Reissued Jan. 15, 1867.
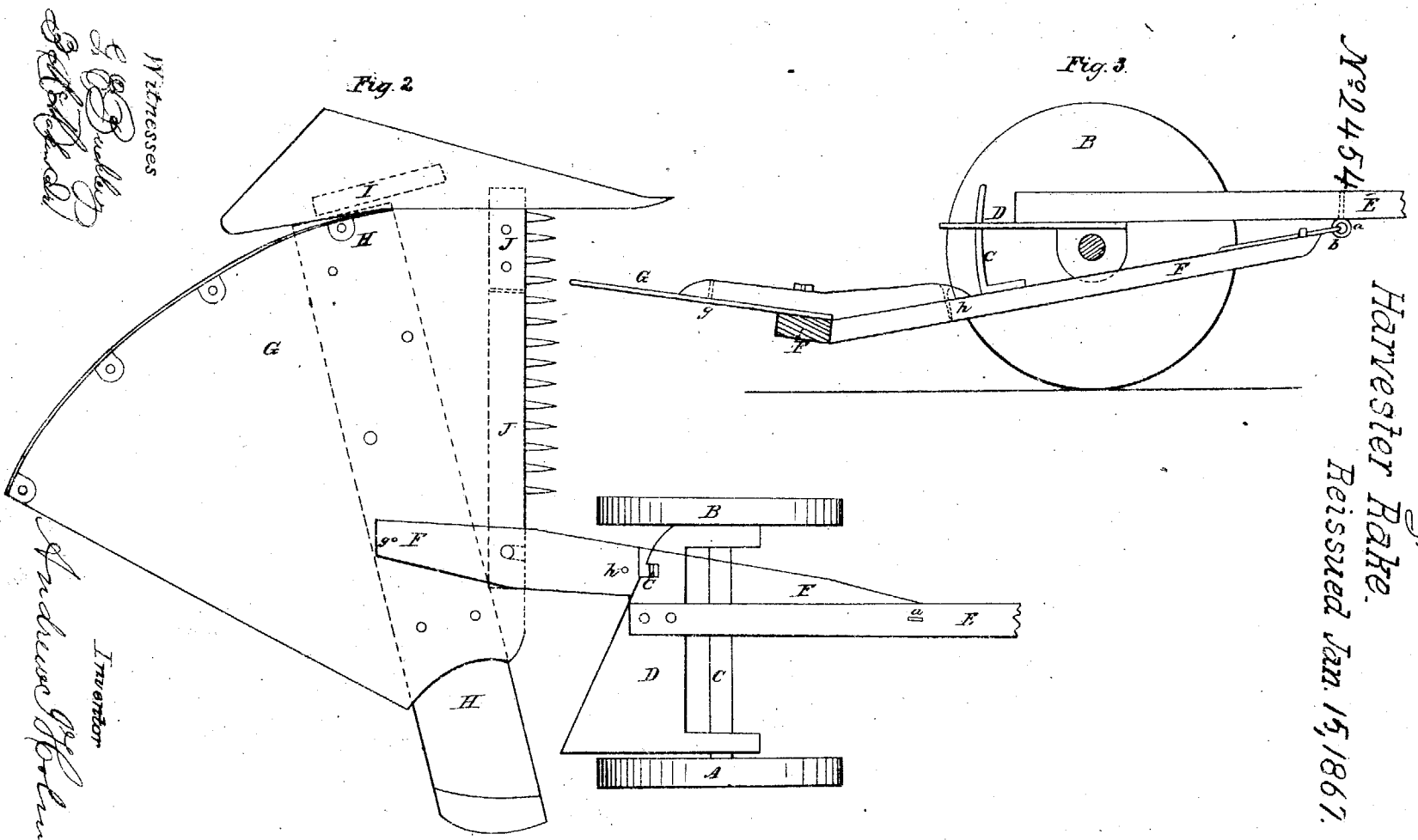
Witnesses
G. E. Dudley
B. M. Wallace Jr.
Inventor
Andrew C. Holman

UNITED STATES PATENT OFFICE.

ANDREW J. HOLMAN, OF PHILADELPHIA, PENNSYLVANIA, ASSIGNEE, BY MESNE ASSIGNMENTS, OF McCLINTOCK YOUNG, JR.

IMPROVEMENT IN HARVESTERS.

Specification forming part of Letters Patent No. 1,803, dated July 9, 1861; reissue No. 2,454, dated January 15, 1867.

*To all whom it may concern:*

Be it known that McCLINTOCK YOUNG, Jr., of Frederick, in the county of Frederick and State of Maryland, did invent certain new and useful Improvements in Harvesting-Machines; and that the following is a full, clear, and exact description of the same, reference being had to the accompanying drawings, making a part of this specification, in which—

Figure 1 represents in perspective so much of a harvesting-machine as illustrates the invention of said McCLINTOCK YOUNG, Jr. Fig. 2 represents a top plan, and Fig. 3 a sectional elevation, of the same.

Similar letters of reference where they occur in the separate figures denote like parts of the machine in all drawing.

The invention relates to the combination of an automatic rake with a combined reaping and mowing machine; or, in other words, to a harvesting-machine having a hinged joint, and also capable of being converted into a reaping or mowing machine, as the case may be; and it consists in the manner of connecting the platform and cutting apparatus with the main frame, so that they may rise and fall in conforming to the surface of the ground independent of each other; and also, in combination with the platform and main frame of a hinged-bar machine, a rake and rake-driving mechanism that will permit the rising and falling of the platform, and yet retain the position of the working parts to the platform; and it consists, lastly, in making the finger-bar in two sections of different lengths, the long section being attached to the main frame, and the short section to the platform, so that when the platform is removed to convert the machine into a grass-mower the finger-bar shall be shortened in length to the extent of the short section attached to the platform.

To enable others skilled in the art to make and use the invention of said McCLINTOCK YOUNG, Jr., the following description of the same, in connection with the drawings, is given.

A B represent two supporting-wheels on an axle, C, the wheel B being fast on the axle, so as to make it a drive-wheel also. On the axle C is supported a frame, D, to which the tongue E is attached, and the tongue E, at or about the point *a* thereon, is connected, by a shackle or link connection, *b*, Fig. 3, to a beam, F, that passes underneath the axle C and thence rearward, to support the platform, cutting apparatus, rake, and rake-driving mechanism, as will be explained. A brace, *c*, extends upward from the beam F, which passes up through a notch, mortise, or guide on the main frame D, so as to keep this beam in line while it or the main frame are free to move vertically as the ground over which they are passing may demand. The platform G is fastened to a platform beam or support, H, which is oblique to and behind the finger-bar, and at the outer end of this support is the outside supporting-wheel I, Fig. 2. The finger-bar is made in two sections, J and J′, the one J, which is much the larger one, being secured to the beam F, and the short section J′ to the platform G; the object of this being to have a short finger-bar and cutter when mowing, and a longer one when reaping, and to make the change without removing or detaching the finger-bar from the main frame to apply another in its place. On the end of the platform-beam H, next the stubble, there is a pillar-block box, K, in which the journal of a bevel-wheel, L, is supported and turns, and upon this pillar-support K there is a horizontal arm-support, O, on which, as a journal and slide, the bevel-pinion M is connected, by a gimbal-joint, as at *d*, Fig. 1, an end of a driving-shaft, N, the other end whereof is supported in a bearing-block, O, upon the projected end of the axle *c* and the extreme end of the shaft N has a bevel-pinion, P, upon it, which is turned by the bevel-wheel Q on the axle C. This arrangement of driving-gear, though shown outside of the supporting-wheel A, may be put inside, or between the wheels A B. The bevel-pinion M turns the bevel-wheel L; and on top of this wheel L is pivoted the rake-shank R, to which the rakes S S are connected, and by which they are rotated. T is a cam-ledge, under which hooks or arms *e* on the rake-stocks take to draw the rakes down to, and make them traverse close over, the platform, the one going down raising up its fellow high enough to pass over the wheels, and then drop onto, or close to, the platform.

When this machine is arranged for mowing everything is taken off except the beam F and the finger-bar J, and which may be done by simply loosening up a screw, *f*. When made into a reaper a saddle-block, F′, is added to the beam F, which has studs or dowels *g h* in it, one for holding the platform, the other for holding itself, in connection with the screw *f* to the beam F. Where the sections of the finger-bar butt together there may be any suitable kind of fastening to keep them together, and in line. For cutting grain the finger-bar and cutters may be from five to six feet in length; but for grass a four feet swath, or four and a half feet, is found to be enough, and for this object the finger-bar is made in sections.

Having thus fully described the invention of said McClintock Young, Jr., what is claimed is—

1. Driving an automatic rake on a two-wheel hinged-bar machine by mechanism located outside of the wheels instead of between the wheels.

2. Locating the vertical axle of an automatic revolving rake upon the platform of a harvester at or near its inner front corner.

3. Driving an automatic rake located on the platform of a two-wheel hinged-bar machine by means of a jointed tumbling-shaft driven from the end of the main axle.

4. The combination of a hinged platform with an automatic rake located at or near its inner front corner.

5. In a floating finger-bar machine the combination of a revolving rake and reel, supported wholly upon the platform at or near its inner front corner in a removable frame, so that said machine can be readily converted from a mower to an automatic reaper, and vice versa.

6. In a hinged finger-bar machine, rigidly connecting the rake-frame to the platform on which it is supported in such a manner that the rake-shaft does not change its relative position to the platform in passing over uneven ground.

7. Attaching the revolving rake and reel-arm directly to the upper side of the crown or bevel-wheel, by which they are driven.

8. Locating the crown or bevel-wheel, to which the arms of the revolving rake or reel are attached, below the top of the driving-wheel.

9. Combining a segmental cam or guide with a series of rake and reel arms, so attached together in pairs diametrically that while one rake is moving in contact with the grain its opposite arm shall be thrown up to any desired extent to clear the driving-wheel and main frame.

10. Arranging the shaft, which drives the revolving rake and reel, located on the platform of a floating finger cutting apparatus, in such a manner that the said shaft shall vibrate around the main shaft as a center, when the cutting apparatus is raised and lowered.

11. The construction and adaptation of a combined rake and reel, which revolves entirely around a vertical center, so that the revolving rake and reel arms may be attached to the driving hub or wheel inside of the plane of the main driving-gear wheel, and below the highest point of said wheel.

12. The combination of a revolving rake and reel, and a hinged-bar machine, when the arms of said revolving rake and reel are attached together to the head at such an angle as in their revolution to be thrown up, so as to leave an unobstructed space on the machine.

13. Attaching the frame or support of the continually-revolving rake to the removable platform, so that the entire rake apparatus can be removed with the platform for converting the machine from a reaper to a mower.

14. Driving the continuously-revolving rake-arms by the upper surface of a crown-wheel, in combination with supporting that crown-wheel on top of a vertical standard, and attaching to the same vertical standard a horizontal stud, on which the driving pinion revolves.

15. A rake rotating upon an axis which is perpendicular to the top surface of the platform, and having its arms successively elevated, substantially as and for the purpose described.

16. A standard or support which sustains the sweep-rake above the draft-frame or driving-wheel, said standard being mounted wholly upon the platform of the hinged machine and below the top of the driving-wheel.

17. Making a finger-bar in two sections, one long and one short, the short section being connected to the platform and removable with it, so that as the platform is attached to adapt the machine for harvesting grain, or removed to adapt it to the cutting of grass, the finger-bar shall be correspondingly lengthened and shortened, as has been found advantageous in harvesting the different materials, substantially as described.

ANDREW J. HOLMAN.

Witnesses:
Geo. E. Buckley,
John White.